United States Patent Office 3,551,374
Patented Dec. 29, 1970

3,551,374
CAULKING AND SEALING COMPOUNDS
Hans Reinhard, Limburgerhof, Pfalz, Germany, and Bernhard Dotzauer, Ludwigshafen (Rhine), Germany, assignors to Badische Anilin- & Soda-Fabrik Aktiengesellschaft, Ludwigshafen (Rhine), Germany
No Drawing. Filed Mar. 28, 1967, Ser. No. 626,424
Claims priority, application Germany, Apr. 2, 1966, 1,569,910
Int. Cl. C08f 29/50, 45/24
U.S. Cl. 260—29.6      6 Claims

ABSTRACT OF THE DISCLOSURE

Caulking and sealing compounds composed of an emulsion polymer of an alkyl ester of an ethylenically unsaturated carboxylic acid and 0.25 to 2.5 parts of a polymer having a K value of 10 to 70 and derived from an acrylic ester and/or methacrylic ester of an alkanol, and/or of a vinyl alkyl ether and/or of butadiene and/or a polymer having a K value of 5 to 40 and derived from isobutylene and/or isoprene, which have been prepared by mixing or emulsifying a practically anhydrous, solvent-free, emulsifiable polymer with or in at least a 50% aqueous dispersion of another polymer, and 0.5 to 2.5 times the weight of the polymer of a conventional filler, can be gunned and extruded into profiles without difficulty, adhere well and shrink to only a very slight extent.

---

This invention relates to caulking and sealing compounds based on soft polymers of ethylenically unsaturated compounds in admixture with organic fillers.

Caulking and sealing compounds based on polymers of ethylenically unsaturated compounds or mixtures of polymers are known. In general the caulking and sealing compounds are prepared by melting together the components or by mixing solutions of the polymers or by mixing suitable monomers with bitumen, tar or pitch and effecting polymerization when these mixtures are used. Permanently plastic putties and sealers based on polyisobutylene or butyl rubber are known which may be of high and/or low molecular weight depending on whether they are to be extruded as profiles or applied by means of a gun. The use of aqueous polymer dispersions for gunnable or extrudable caulking and sealing compounds would be advantageous because polymers having special properties are easy to prepare by emulsion polymerization. The use of aqueous polymer dispersions for this purpose has not however been adopted in practice because the high water content of the dispersions causes a marked shrinkage of the seals prepared therewith. The compound which originally completely fills the gap later develops a concave surface. Although it is possible, by adding fillers, to decrease the water content and consequently to reduce the tendency of the compounds to shrink, the adhesive and cohesive properties of the emulsion polymers are in general adversely affected by the addition.

The object of this invention is to provide caulking and sealing compounds which can be applied by means of a gun and shaped without difficulty and which contain conventional inorganic fillers. Another object of the invention is to provide caulking and sealing compounds which contain soft polymers of ethylenically unsaturated compounds and conventional inorganic fillers and which adhere well and exhibit the least possible shrinkage. Other objects of the invention will be evident to the expert from the following description.

We have found that caulking compounds and sealants based on soft polymers of ethylenically unsaturated compounds and 0.5 to 2.5 times the weight of the polymers of conventional inorganic fillers, which contain a total of 8 to 18% by weight of water and, as polymers of ethylenically unsaturated compounds, a mixture of:

(a) 1 part of an emulsion polymer A of an ester of an ethylenically unsaturated carboxylic acid containing three to five carbon atoms with an alkanol containing one to twelve carbon atoms,
(b) 0.25 to 2.5 parts of
    ($b^1$) a polymer B having a K value of 10 to 70 and derived from an ester of acrylic acid and/or methacrylic acid with a monohydric aliphatic alcohol having two to eight carbon atoms in the alcohol radical and/or of a vinyl alkyl ether having one to four carbon atoms in the alkyl radical and/or of butadiene and/or
    ($b^2$) a polymer B having a K value of 5 to 40 and derived from isobutylene or isoprene and which have been prepared by mixing or emulsifying the practically anhydrous, solvent-free and emulsifiable polymer B with or in an at least 50% aqueous dispersion of the polymer A, have the desired properties and additional advantageous properties.

Patriculars of the said components of the putties and sealers and their production are given below.

Suitable emulsion polymers A of esters of ethylenically unsaturated carboxylic acids having three to five carbon atoms and alkanols having one to twelve and particularly four to twelve carbon atoms are polymers composed to the extent of at least 50% by weight of units of the said monomers. Acrylic acid, methacrylic acid, maleic acid, fumaric acid and itaconic acid are examples of ethylenically unsaturated carboxylic acids having three to five carbon atoms. The esters of acrylic acid and methacrylic acid are the preferred esters of the said acids for the production of the polymer A. Very suitable polymers A are those having glass temperatures of less than —5° C. Emulsion polymers of acrylic esters and methacrylic esters, which are resistant to ageing and adhere well, are particularly suitable. Examples of suitable emulsion polymers A are the homopolymers poly(ethyl acrylate), poly(isopropyl acrylate), and poly(n-butyl acrylate) and the copolymers of n-butyl acrylate, di-n-butyl maleate, isobutyl itaconate, 2-ethylhexyl acrylate and 2-ethylhexyl methacrylate with each other and/or with other esters of acrylic acid or methacrylic acid and/or with ethylenically unsaturated monomers which form rigid homopolymers. Acrylonitrile, methacrylonitrile, styrene, α-methylstyrene, vinyl chloride, vinylidene chloride and vinyl acetate are preferred comonomers. It has proved to be very advantageous to employ monomers having carboxyl groups, particularly ethylenically unsaturated carboxylic acids having three to five carbon atoms, in amounts of about 0.5 to 5% and particularly 0.5 to 2% by weight in the production of the polymers in order to improve the stability of the aqueous dispersions and to improve the adhesive properties of the polymers A. In some cases it is also advantageous to incorporate by polymerization small amounts, i.e. 0.1 to 10% and particularly 0.5 to 5% by weight of units, of monomers which impart to the copolymers other reactive groups and, for example, make possible a crosslinking by alkaline-reacting substances. Examples of monomers having carboxyl groups and monomers which introduce other reactive groups into the polymer are acrylic acid, methacrylic acid, itaconic acid, acrylamide, methacrylamide, N-methylolmethacrylamide and the ethers of such N-methylol compounds, for example the n-butyl ether of N-methylolacrylamide as well as butanediol monoacrylate and 3-chloro-1,2-propanediol acrylate-(1). The properties of the resultant caulking compounds and sealants may be influenced by suitable choice of the main components of the polymer A. For example copolymers have proved to be suitable which have been prepared from 88 to 92% by weight of n-butyl acrylate and 8 to 12% by weight of acrylonitrile; from 70 to 75% by weight of n-butyl acrylate and 25 to 30% by weight of methyl acrylate; from 65 to 75% by weight of decyl acrylate, 20 to 30% by weight of methyl methacrylate and 0.5 to 5% by weight of acrylic acid; from 82 to 87% by weight of 2-ethylhexyl acrylate, 12 to 15% by weight of styrene and 1 to 3% by weight of acrylic acid; or from 70 to 85% by weight of 2-ethylhexyl acrylate and 15 to 30% by weight of vinyl chloride. Owing to the good resistance to low temperatures and to alkalis, the good adhesion, the high flexibility and good compatibility with the copolymers B, copolymers derived from 78 to 88% by weight of 2-ethylhexyl acrylate, 7 to 20% by weight of acrylonitrile and/or methacrylonitrile and 2 to 5% by weight of acrylic acid and/or methacrylic acid have proved to be particularly suitable as polymers A. The use of copolymers derived from 58 to 81% by weight of n-butyl acrylate, 18 to 38% by weight of methyl acrylate and 1 to 5% by weight of acrylic acid have proved to be very advantageous for caulking and sealing compounds exhibiting good cohesion and adhesion. The percentages are by weight on the emulsion polymers.

Of the polymers of esters of acrylic acid and/or methacrylic acid and alkanols having two to eight and particularly three to four carbon atoms which are contained in 0.25 to 2.5 times and particularly 0.3 times to twice the weight of polymers A in the caulking and sealing compounds, those having K values of 10 to 70, particularly 30 to 50 are suitable as polymers B. Polymers which have been prepared by polymerization in bulk or in organic solvents are particularly suitable. It is advantageous to use polymers which contain as units 90 to 100% by weight of the said esters or 50 to 60% by weight of these esters and 0 to 40% by weight of acrylonitrile and/or methacrylonitrile and 0 to 10% by weight of other polar hydrophilic monomers, such as ethylenically unsaturated acids, such as acrylic acid or methacrylic acid.

Of the polymerized vinyl alkyl ethers having one to four carbon atoms in the alkyl radical, the polymers having K values of 10 to 70, particularly 15 to 50, are particularly suitable as polymers B. The use of polyvinyl alkyl ethers may result in special advantages. Thus polyvinyl methyl ether mixed with polyvinyl isobutyl ether on the one hand is an effective component of the cured caulking and sealing compounds and on the other hand it may have a stabilizing effect as a protective colloid in the production and storage of a gunnable caulking compound.

When using polyvinyl ethers, their oxidizability must be taken into consideration. When mixed with compatible emulsion polymers A, the oxidizability of the polyvinyl ethers is decreased, but nevertheless it is preferred to use the polymers of vinyl methyl ether and particularly vinyl isobutyl ether (which are relatively resistant to oxidation), if desired with an addition of antioxidants.

However, use may be made of the ready oxidizability of polyvinyl ethyl ether in soft mixtures in order to impart a non-tacky surface to the joint. In this case stabilization of the polymerized vinyl ether is dispensed with or oxidation of the same is even promoted by adding heavy metal oxides to the caulking compound. Non-tacky surfaces are formed particularly rapidly in sunlight in these cases.

Suitable polymers B among the butadiene polymers are those having K values of 10 to 70 and particularly of 20 to 50, especially oily butadiene homopolymers and oily copolymers of butadiene with styrene and/or α-methylstyrene and/or isobutylene. Oily polymers which have been isomerized or reacted with cyclic anhydrides of unsaturated carboxylic acids, such as maleic anhydride, are very suitable. When using oily butadiene polymers, very soft putties which give non-tacky surfaces are obtained by adding driers.

Polymers of isobutylene which are particularly suitable as polymers B are polyisobutylene, butyl rubber or other copolymers, for example those derived from 90% by weight of isobutylene and 10% by weight of styrene, which have K values of 5 to 40, particularly 10 to 25. Instead of the said polymers it is also possible to use other polymers which have similar properties and are emulsifiable, such as the emulsifiable copolymers of ethylene with propylene, vinyl acetate and/or acrylic esters having the consistency of a soft resin. Mixtures of polymers and copolymers suitable as polymers B may obviously also be used within the scope of the invention.

The properties of the resultant caulking and sealing compounds may be adapted to special applications by appropriate choice of the emulsion polymers A and the emulsifiable polymers B. Thus for example, if a sealing compound which is particularly resistant to alkalis is desired, an emulsion polymer resistant to hydrolysis, e.g. a copolymer of 2-ethylhexyl acrylate and acrylonitrile is combined with polyisobutylene, or copolymers of isobutylene with isoprene or butadiene, particularly with copolymers derived from 60 to 80% by weight of isobutylene and 20 to 40% by weight of butadiene. If, on the other hand, the caulking or sealing compound is to be resistant to oil in particular, mixtures of the polymers A with a polyacrylate ($b^1$) are preferred.

Plasticizers, drying oils, stabilizers and emulsifiers may be added in the usual way both to the polymers B and to the polymer mixtures. It has therefore proved advantageous to add emulsifiers to the polymers B prior to mixing with aqueous dispersions of the polymers A. The emulsifiers and protective colloids which are preferred are those which permit the production of stable and highly concentrated dispersions. They are preferably added in amounts of 0.25 to 5% by weight, with reference to the polymers B. Anionic and nonionic emulsifiers are particularly suitable for the purpose and nonionic surface-active adducts of 5 to 50 moles of ethylene oxide to 1 mole of an alkylphenol, a fatty alcohol, a fatty acid or a long-chain amine, and the salts of their sulfonation products, have proved to be especially suitable.

We have also found that, surprisingly, the addition of ureaformaldehyde resins and particularly urea-formaldehyde resins which have been modified with bisulfiite, in amounts of 0.5 to 10% by weight of solid resin (on the amount of polymer A and B (solid)) to the polymers A to the dispersion is very advantageous. These resins, which are usually in the form of solutions having solids contents of at least 60% by weight or in the form of powder, facilitate the absorption of fillers and improve the pigment binding power of the dispersions of polymers A. They also increase the adhesion of the caulking compounds or sealers to wood and other materials.

According to this invention the production of the mixtures of emulsion polymers A with the polymers B may be carried out by stirring or emulsifying the practically anhydrous and solvent-free emulsifiable polymers B into the at least 50% and particularly 55 to 60% aqueous dispersion of the polymers A. The mixtures of polymers A and B advantageously contain 0.5 to 5.0% by weight (with reference to the amount (solid) of these polymers A and B) of emulsifiers and/or protective colloids. In one embodiment of the invention the aqueous dispersion of polymer A is placed in a vessel provided with stirring means and the polymer B which is added gradually is dispersed therein homogeneously. This mixing process may advantageously be carried out while heating the dispersion, for example to temperatures of 50° to 70° C., and accelerated by adding further emulsifier or protective colloid. It has also proved advantageous to add to the mixtures, polyalcohols, such as ethylene glycol or glycerol, in amounts of 0.5 to 10% by weight on the anhydrous polymer mixture, because they facilitate the subsequent incorporation of fillers in the mixture and improve the gunnability of the resultant caulking and sealing compounds. In the preparation of the compounds according to this invention it is possible to start from polymer dispersions which are obtained with a solids content of at least 50% by emulsion polymerization or from dispersions which are adjusted to a solids content of at least 50% by weight by subsequent concentration or by adding powdered reemulsifiable polymers.

Asbestos powder, chalk, heavy spar, blancfixe, titanium dioxide, quartz powder, zinc oxide, carbon black, talc and kaolin may be given as examples of inorganic filers which are usually incorporated in the highly concentrated dispersion after the polymer A has been mixed with the polymer B. The fillers are in general added to the mixtures in an amount 0.5 to 2.5 times and particularly once or twice the weight of the polymers A and B (solid). Since the cohesion of the compounds may be varied by the type of filler, the use of mixtures of fillers is of interest. If it is desired to increase the cohesion of the polymer mixtures, asbestos powder and/or chalk can be added. If, on the other hand, the cohesion of the polymer mixture is to remain unchanged, the addition of quartz powder and/or talc is advantageous. If the cohesion is to be increased to only a small extent, the addition of mixtures of the said fillers has proved advantageous.

Caulking and sealing compounds according to this invention have many advantageous properties. In spite of their very low water content, they are true plastic dispersions which have a surprisingly long stability in storage of several months. Owing to their character as plastics dispersions, containers or mixing apparatus in which the compounds have been stored or processed may be cleaned simply by spraying out with water if this is done immediately after they have been emptied.

In contrast to the prior art permanently plastic and elastic caulking and sealing compounds, it is possible with the compounds according to this invention to fill building joints which are moist or even wet with rain, which considerably facilitates their use. Furthermore, by reason of the excellent adhesion properties of the compounds according to this invention, the primer which is still usually applied may be dispensed with. Owing to their low water content, the compounds according to the invention upon use form a film on the surface of the seal which prevents it from being washed out even by heavy rain.

The caulking and sealing compounds have excellent adhesion to the usual materials, such as wood, ceramics, concrete, glass, steel, aluminum and painted metal sheets. Owing to this property and their easy processability, they are outstandingly suitable for filling expansion joints in reinforced concrete structures and other building joints. Joint cavities formed during building with prefabricated parts may be filled in a satisfactory way with the caulking compounds according to the invention. Owing to their low water content, the compounds may even be used for bonding water-impermeable articles together provide the bonds are allowed to set for some time, for example several hours, at room temperature.

The caulking compounds and sealants according to the invention may be gunned or extruded into profiles without difficulty and may be applied with conventional equipment. It is advantageous, when preparing caulking and sealing profiles, to extrude the compounds through nozzles and dry them at elevated temperature. Joints prepared with the compounds have only a slight tendency to shrink. The slight shrinkage of the seals caused by loss of water may be completely avoided by adding to gunnable formulations 0.05 to 1% by weight of aluminum powder or by incorporating 1 to 10% by weight of chalk or another inorganic carbonate in a compound based on an acid dispersion of polymer A.

After setting joints of polymer mixtures of the appropriate composition are resistant to oil. In spite of their good gunnability, they have substantial resistance to heat. Thus heating to about 80° C. for a day does not cause the compound used to run or to become deformed. Another advantage is that they remain elastic when cold, i.e. at temperatures below 0° C., and retain their good adhesive properties.

The said properties put the putties and sealers according to this invention in a class of their own. As one-component caulking compounds they are just as convenient to handle as permanently plastic putties but they are superior to these in their excellent thermal stability and oil resistance. They thus possess, as a one-component caulking compound, the properties of two-component systems which are less convenient to handle.

As already stated, the properties of the caulking compounds can be varied to a wide extent by appropriate choice of the polymers A and B and the fillers. Reference has already been made to the possibility of hardening the surface of the caulking compound by using diene polymers as polymers B. It is also possible to vulcanize mixtures with diene polymers, such as polybutadiene, if the substances required for cold vulcanization are added thereto. Sealants having valuable properties are thus obtained, although a decrease in their stability in storage has to be put up with.

The following examples will further illustrate the invention. Examples 1 to 10 illustrate the advantageous properties of caulking and sealing compounds in accordance with the invention using as an example a mixture of a 60% dispersion of a copolymer derived from 87% by weight of 2-ethylhexyl acrylate, 11% by weight of acrylonitrile and 2% by weight of acrylic acid with different polymers B and different fillers.

Test specimens are prepared with the mixtures as follows:

Small blocks of beechwood (120 x 45 x 10 mm.) which have been placed are secured by spots of contact adhesive to strong cardboard so that there is a gap 15 mm. in width between the longest sides of the blocks, the largest surface being fastened to the substrate. In order to prevent the caulking compound from sticking to the cardboard, strips of siliconized paper are used. The gap is then filled with the sealant to be tested and any superfluous compound is scraped off with a knife. The specimen is then kept for one week at room temperature and for a further forty-eight hours at 80° C. This makes certain that the sealer in the joint is free from water for the following test.

In the tensile test in longitudinal direction in a tension tester with a feed of 20 mm./minute, the tensile strength (kg./sq. cm.) is determined which may be regarded as a measure of the cohesive strength of the sealing compound. The elongation thus occurring is given as a percentage and relates to the width of the original joint (15 mm.).

To determine the permanent extension, the joint is stretched to a given length and the recovery is measured after it has been left for twenty-four hours at 20° C. The difference between the original thickness of the joint and the thickness after elongation is given as a percentage and relates to the original diameter of the joint.

The shrinkage which occurs relates to the cross section of the joint (15 x 10 mm.) and is also given as a percentage.

Testing for resistance to oil is carried out as follows: Bleached soda kraft paper (weighing about 80 g./sq. m.) is coated by means of a doctor blade with a film having a thickness of about 300 microns of the sealing compound in question. In intimate joint between plastics screw closures having a hole 1 cm. in diameter and the film of sealing compound is produced by lightly pressing the two together followed by drying. The closures thus prepared are screwed onto glass bottles which contain a deep blue colored commercial motor oil. The bottles are then stored upside down. If a film is not resistant to oil, a blue stain appears on the uncoated side of the soda kraft paper.

The amounts of filler given in the examples as percentages relate in each case to the anhydrous mixtures of the polymers A and B used. The K values given are determined by the method of H. Fikentscher, Cellulosechemie 13 (1932) 58 at 20° C. with an Ubbelohde viscometer. In the case of polymers of acrylic esters measurement is effected using 1% solutions in ethyl acetate; in the case of polyvinyl ethers, 1% solutions in benzene are used and in the case of polybutadienes and polymers of isobutylene and butadiene 5% solutions in benzene are employed.

EXAMPLE 1

5 parts of a 60% aqueous dispersion of the above specified polymer A is intimately mixed with 1 part of polyisobutylene (K value 18) with which 1.5% of its weight of a reaction product of 1 mole of sperm oil fatty alcohol and 25 moles of ethylene oxide has been mixed. Then 200% of chalk (with reference to the anhydrous mixture of polymers) is added.

The caulking compound is also suitable for the production of caulking profiles, particularly when it contains 5 to 10% of asbestos powder.

This compound is tested and the results are as follows:

Consistency: still gunnable
Stability in storage: very good
Water content (percent by weight): 14.3
Shrinkage: about 8%
Tensile test at 20° C.:
    Tensile strength: about 5 kg./sq. m. at 300% elongation
    Elongation at break: about 800%
    Permanent extension: about 4% after 300% elongation
Tensile test at about −18° C.:
    Tensile strength: about 9 kg./sq. m. at 170% elongation
    Elongation at break: about 265%
Resistance to oil: no penetration after one week.

EXAMPLE 2

A caulking compound is prepared as in Example 1 but 2 parts of polyisobutylene is mixed with 3 parts of the 60% aqueous dispersion of the abovementioned polymer A and 100% of chalk (with reference to the anhydrous mixture of polymers) is incorporated.

This compound is tested and the results are as follows:

Consistency: gunnable
Stability in storage: very good
Water content (percent by weight): 13.6
Shrinkage: about 5%
Tensile test at 20° C.:
    Tensile strength: about 2 kg./sq. m. at 500% elongation
    Elongation at break: about 600%
    Permanent extension: about 7% after 230% elongation
Tensile test at about −18° C.:
    Tensile strength: about 3.5 kg./sq. m. at 400% elongation
    Elongation at break: about 330%
Resistance to oil: penetration in less than twenty-four hours.

EXAMPLE 3

3 parts of the dispersion of the abovementioned polymer A are mixed as described above with 2 parts of a poly(n-butylacrylate) having a K value of 32 which contains 2% of a reaction product of 1 mole of sperm oil fatty alcohol and 25 moles of ethylene oxide. Then 120% of chalk (with reference to the anhydrous polymer mixture) is incorporated.

The following test results are obtained:

Consistency: gunnable
Stability in storage: very good
Water content (percent by weight): 12.6
Shrinkage: about 4 to 5%
Tensile test at 20° C.:
    Tensile strength: about 1.4 kg./sq. cm. at 500% elongation
    Elongation at break: about 800%
    Permanent extension: about 3 to 4% after 400% elongation
Tensile test at about −18° C.:
    Tensile strength: about 5 kg./sq. cm. at 320% elongation
    Elongation at break: about 350%
Resistance to oil: no penetration after two weeks.

EXAMPLE 4

A sealing compound is prepared as described in Example 3 but 80% of quartz powder, 120% of talc and 10% of carbon black (percent with reference to the anhydrous polymer mixture) are incorporated as fillers.

This compound is tested and the results are as follows:

Consistency: gunnable
Stability in storage: very good
Water content (percent by weight): 10.2
Shrinkage: 3 to 4%
Tensile test at 20° C.:
    Tensile strength 1.2 kg./sq. cm. at about 360% elongation
    Elongation at break: about 600%
    Permanent extension: about 5% after 300% elongation
Tensile test at about −18° C.:
    Tensile strength: about 4.2 kg./sq. cm. at 100% elongation
    Elongation at break: about 150%
Resistance to oil: no penetration after two weeks.

EXAMPLE 5

5 parts of a dispersion of the abovementioned polymer A is mixed with 1 part of a poly(vinyl isobutyl ether) having a K value of about 32 which contains 2% of a reaction product of 1 mole of isooctylphenol and about 40 moles of ethylene oxide as well as 0.5% of an antioxidant and converted into a dispersed mixture. Then 150% of chalk and 50% of quartz powder (with reference to the anhydrous mixture of polymers) are incorporated into the mixture.

The test results are as follows:

Consistency: gunnable
Stability in storage: very good
Water content (percent by weight): 14.3
Shrinkage: about 7 to 8%
Tensile test at 20° C.:
    Tensile strength: about 3.8 kg./sq. cm. at 200% elongation
    Elongation at break: about 230%
    Permanent extension: about 3% after 200% elongation
Tensile test at about −18° C.:
    Tensile strength: about 7 kg./sq. cm. at 140% elongation
    Elongation at break: about 200%
Resistance to oil: penetration after twelve days.

EXAMPLE 6

The procedure of Example 5 is followed, but 3 parts of the dispersion of polymer A is mixed with 2 parts of poly(vinyl isobutyl ether). 4% of ethylene glycol, 80% of quartz powder, 40% of heavy spar, 20% of chalk, 10% of carbon black and 75% of talc (percent with reference to the anhydrous mixture of polymers) are then added to the dispersion mixture.

The test results are as follows:

Consistency: gunnable
Stability in storage: very good
Water content (percent by weight): 8.7
Shrinkage: about 4%
Tensile test at 20° C.:
  Tensile strength: 0.5 kg./sq. cm. at about 500% elongation
  Elongation at break: about 700%
  Permanent extension: about 15% after 200% elongation
Tensile test at about −18° C.:
  Tensile strength: about 5 kg./sq. cm. at 200% elongation
  Elongation at break: about 700%
Oil resistance: penetration after six days.

EXAMPLE 7

5 parts of the dispersion of the abovementioned polymer A is processed into a homogeneous dispersion mixture with 1 part of a polybutadiene oil having a K value of 28 which has been modified with 10% of maleic anhydride and which contains 2% of the reaction product of 1 mole of sperm oil fatty alcohol and 35 moles of ethylene oxide, as well as 0.25% of a lead drier, and then 200% of quartz powder is added (with reference to the anhydrous mixture of polymers).

The test results are as follows:

Consistency: gunnable
Stability in storage: very good
Water content (percent by weight): 14.3
Shrinkage: about 8%
Tensile test at 20° C.:
  Tensile strength: 1.8 kg./sq. cm. at 200% elongation
  Elongation at break: about 500%
  Permanent extension: less than 3% after about 180% elongation
Tensile test at about −18° C.:
  Tensile strength: about 5.1 kg./sq. cm. at 120% elongation
  Elongation at break: about 170%
Oil resistance: no penetration after two weeks.

EXAMPLE 8

The procedure of Example 7 is followed, but a ratio of the amounts of dispersion to polybutadiene oil of 3:2 is used and 100% of quartz powder is added as filler.

The following test results are obtained:

Consistency: gunnable
Stability in storage: very good
Water content (percent by weight): 13.5
Shrinkage: 5 to 6%
Tensile test at 20° C.:
  Tensile strength: about 1.5 kg./sq. cm. at 350% elongation
  Elongation at break: about 600%
  Permanent extension: about 3 to 4% after 300% elongation
Tensile test at about −18° C.:
  Tensile strength: about 5.2 kg./sq. cm. at 200% elongation
  Elongation at break: about 530%
Oil resistance: no penetration after two weeks.

EXAMPLE 9

A homogeneous mixture is prepared from 5 parts of the dispersion of the abovementioned polymer A and 1 part of a polybutadiene oil isomerized in the presence of iron carbonyl and having a K value of 23 which contains 2% of a reaction product of 1 mole of sperm oil fatty alcohol and 40 moles of ethylene oxide. 150% of chalk and 50% of quartz powder (percent with reference to the anhydrous mixture of polymers) are kneaded in.

The test results are as follows:

Consistency: gunnable
Stability in storage: very good
Water content (percent by weight): 14.3
Shrinkage: about 8 to 9%
Tensile test at 20° C.:
  Tensile strength: about 3.5 kg./sq. cm. at 300% elongation
  Elongation at break: about 600%
  Permanent extension: about 3% after 300% elongation
Tensile test at about −18° C.:
  Tensile strength: about 9 kg./sq. cm. at 150% elongation
  Elongation at break: about 160%
Oil resistance: no penetration after two weeks.

EXAMPLE 10

The procedure of Example 9 is followed, but 3 parts of the dispersion of polymer A is mixed with 2 parts of the polybutadiene oil and then 100% of chalk is added as a filler.

The test results are as follows:

Consistency: gunnable
Stability in storage: very good
Water content (percent by weight): 13.6
Shrinkage: about 7%
Tensile test at 20° C.:
  Tensile strength: about 2.2 kg./sq. cm. at about 350% elongation
  Elongation at break: about 400%
  Permanent extension: about 4% after 280% elongation
Tensile test at about −18° C.:
  Tensile strength: about 4 kg./sq. cm. at 140% elongation
  Elongation at break: about 200%
Oil resistance: no penetration after two weeks.

EXAMPLE 11

A homogeneous mixture is prepared by the method described above from 5 parts of a 62% aqueous dispersion of a copolymer derived from 79% of vinyl propionate, 20% of tertiary-butyl acrylate and 1% of acrylamide and from 1 part of a copolymer derived from 95% of n-butyl acrylate and 5% of vinyl isobutyl ether (K value 20). 1.5% of a reaction product of 1 mole of sperm oil fatty alcohol and 30 moles of ethylene oxide is previously incorporated in the last-mentioned polymer.

The mixture is mixed with 120% of chalk and 80% of fine quartz powder (percent with reference to the anhydrous mixture of polymers).

The following test results are obtained:

Consistency: gunnable
Stability in storage: very good
Water content (percent by weight): 13.3
Shrinkage: about 7%
Tensile test at 20° C.:
  Tensile strength: about 2 kg./sq. cm. at 700% elongation
  Elongation at break: more than 900%
  Permanent extension: about 20% at 500% elongation
Tensile test at −18° C.:
  Tensile strength: about 7.5 kg./sq. cm. at 130% elongation
  Elongation at break: about 150%
Oil resistance: penetration after twelve days.

EXAMPLE 12

A homogeneous mixture is prepared from 2 parts of a 60% aqueous dispersion of a copolymer derived from 70% of n-butyl acrylate, 25% of styrene and 5% of acrylic acid and from a copolymer derived from 89% of 2-ethylhexyl acrylate, 10% of acrylonitrile, 1% of butanediol monoacrylate (K value 29), which contains 2% of a reaction product of 1 mole of sperm oil fatty acid and 35 moles of ethylene oxide. 140% of chalk (with reference to the anhydrous polymer mixture) is incorporated in the homogeneous mixture.

The following test results are obtained:

Consistency: gunnable
Stability in storage: very good
Water content (percent by weight): 13.1
Shrinkage: about 5%
Tensile test at 20° C.:
    Tensile strength: about 4 kg./sq. cm. at 160% elongation
    Elongation at break: about 180%
    Permanent extension: about 8% after 140% elongation
Tensile test at −18° C.:
    Tensile strength: about 6.5 kg./sq. cm. at 120% elongation
    Elongation at break: about 140%
Oil resistance: penetration after three days.

EXAMPLE 13

A homogeneous mixture is prepared from 2 parts of a 60% aqueous dispersion of a copolymer derived from 98% of ethyl acrylate and 2% of acrylic acid and from 1 part of a polymer of 100% of n-butyl acrylate (K value 32) to which 1.2% of a reaction product of 1 mole of isooctylphenol and 35 moles of ethylene oxide has previously been added. The mixture is then mixed with 150% of chalk (with reference to the anhydrous polymer mixture).

The test results are as follows:

Consistency: gunnable
Stability in storage: very good
Water content (percent by weight): 12.7
Shrinkage: about 5%
Tensile test at 20° C.:
    Tensile strength: about 1 kg./sq. cm. at 140% elongation
    Elongation at break: about 180%
    Permanent extension: about 5% after 140% elongation
Tensile test at −18° C.:
    Tensile strength: about 2.5 kg./sq. cm. at 120% elongation
    Elongation at break: about 160%
Oil resistance: penetration after ten days.

EXAMPLE 14

A homogeneous mixture is prepared from 2 parts of a 60% aqueous dispersion of a copolymer derived from 70% of n-butyl acrylate, 18% of acrylonitrile, 6% of butanediol monoacrylate, 4% of N-methylolmethacrylamide and 2% of acrylic acid and from 1 part of polyvinyl isobutyl ether (K value 51) which contains 1.2% of a reaction product of 1 mole of isooctylphenol and 35 moles of ethylene oxide as well as 0.5% of a commercial ageing retardant. This mixture has 140% of chalk and 20% of fine quartz powder (percent with reference to the anhydrous polymer mixture) added to it.

The test results are as follows:

Consistency: gunnable
Stability in storage: very good
Water content (percent by weight): 12.3
Shrinkage: 4 to 5%
Tensile test at 20° C.:
    Tensile strength: about 5 kg./sq. cm. at 125% elongation
    Elongation at break: about 160%
    Permanent extension: about 9% after 130% elongation
Tensile test at −18° C.:
    Tensile strength: about 8 kg./sq. cm. at 125% elongation
    Elongation at break: about 130%
Oil resistance: penetration after two days.

EXAMPLE 15

A homogeneous mixture is prepared from 1.8 parts of a 63% dispersion of a copolymer derived from 79% of n-butyl acrylate, 20% of methyl acrylate and 1% of acrylic acid and from 1 part of poly-n-butyl acrylate having a K value of 32 which contains 1.8% of a reaction product of sperm oil fatty alcohol and 40 moles of ethylene oxide. 150% of chalk (with reference to the anhydrous polymer mixture) is incorporated as a filler.

The following test results are obtained:

Consistency: gunnable
Stability in storage: very good
Water content (percent by weight): 11
Shrinkage: about 6%
Tensile test at 20° C.:
    Tensile strength: about 2.5 kg./sq. cm. at 300% elongation
    Elongation at break: more than 900%
    Permanent extension: about 8% after 250% elongation
Tensile test at −18° C.:
    Tensile strength: about 7.5 kg./sq. cm. at 230% elongation
    Elongation at break: 390 to 420%
Oil resistance: penetration after ten days.

EXAMPLE 16

A homogeneous mixture is prepared from 5 parts of a 65% aqueous dispersion of a copolymer derived from 70% of n-butyl acrylate, 29% of vinylidene chloride and 1% of acrylic acid and from 1 part of polyvinyl isobutyl ether having a K value of 51 which contains 1.5% of a reaction product of 1 mole of isooctylphenol and 35 moles of ethylene oxide as well as 0.5% of a commercial ageing retardant. 160% of chalk (with reference to the anhydrous polymer mixture) is incorporated in this mixture.

The test results are as follows:

Consistency: gunnable
Stability in storage: very good
Water content (percent by weight): 13.5
Shrinkage: 6 to 7%
Tensile test at 20° C.:
    Tensile strength: about 1 kg./sq. cm. at 200% elongation
    Elongation at break: about 420%
    Permanent extension: about 4% after 220% elongation
Tensile test at −18° C.:
    Tensile strength: about 3.2 kg./sq. cm. at 170% elongation
    Elongation at break: about 380%
Oil resistance: penetration after nineteen days.

We claim:
1. A caulking or sealing compound consisting essentially of soft polymers of ethylenically unsaturated compounds and 0.5 to 2.5 times the weight of the polymers of conventional inorganic fillers which contain a total of 8 to 18% by weight with reference to the compound of water and which contain, as the polymers, a mixture of:
    (a) 1 part by weight of an emulsion polymer A of an ester of an ethylenically unsaturated carboxylic acid having three to five carbon atoms and an alkanol having one to twelve carbon atoms which is in the form of an at least 50% aqueous polymer dispersion, said polymer A being composed of at least 50% by weight of units of said esters and
    (b) 0.25 to 2.5 parts by weight of an emulsifiable polymer B having a K value of 10 to 70 of an ester of acrylic acid or methacrylic acid and an alkanol having two to eight carbon atoms, or a vinyl alkyl ether having one to four carbon atoms in the alkyl radical, or butadiene, or an emulsifiable polymer B having a K value of 5 to 40 of isobutylene, or isoprene, or mixtures of said polymer B, said polymer B having been obtained by bulk polymerization or by solution polymerization.

2. A caulking or sealing compound as claimed in claim 1 which contains, as the emulsion polymer A, an emulsion copolymer of an ester of a monocarboxylic acid containing three to five carbon atoms and an alkanol containing four to twelve carbon atoms with 0.5 to 5% by weight (with reference to the copolymer) of an ethylenically unsaturated carboxylic acid containing three to five carbon atoms.

3. A caulking or sealing compound as claimed in claim 1 which contains, as the emulsion polymer A, an emulsion-copolymer of 78 to 88% by weight of 2-ethylhexyl acrylate, 7 to 20% by weight of acrylonitrile or methacrylonitrile and 2 to 5% by weight of acrylic acid or methacrylic acid.

4. A caulking or sealing compound as claimed in claim 1 which contains, as emulsifiable polymers B, polymers having K values of 30 to 50 of esters of acrylic acid or methacrylic acid with alkanols containing two to eight carbon atoms.

5. A caulking or sealing compound as claimed in claim 1 which contains, as the emulsifiable polymer B, a poly(vinyl isobutyl ether) having a K value of 15 to 50.

6. A caulking or sealing compound as claimed in claim 1 wherein said polymer A is composed of from 0 to 50% by weight of units of monomers slected from the group consisting of acrylonitrile, methacrylonitrile, styrene, α-methyl styrene, vinyl chloride, vinylidene chloride and vinyl acetate.

References Cited
UNITED STATES PATENTS

| | | | |
|---|---|---|---|
| 2,986,544 | 5/1961 | Driscoll | 260—29.7U |
| 3,196,122 | 7/1965 | Evans | 260—29.6S |
| 3,222,419 | 12/1965 | Jubilee et al. | 260—29.6UX |
| 3,386,929 | 6/1968 | Brunel | 260—29.6UX |
| 3,421,277 | 1/1969 | Frischmuth | 260—29.6UX |

MURRAY TILLMAN, Primary Examiner

H. ROBERTS, Assistant Examiner

U.S. Cl. X.R.

260—29.4, 29.7, 41, 887, 901